(12) United States Patent
Obliger et al.

(10) Patent No.: US 12,059,093 B2
(45) Date of Patent: Aug. 13, 2024

(54) BEVERAGE EXTRACTION UNIT FOR SELECTIVELY PROVIDING ORIFICES OF DIFFERENT TYPES IN A CAPSULE FOR EXTRACTION OF THE BEVERAGE

(71) Applicant: SOCIETE DES PRODUITS NESTLE S.A., Vevey (CH)

(72) Inventors: Nicolas Obliger, Franey (FR); Marco Magatti, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 747 days.

(21) Appl. No.: 16/980,012

(22) PCT Filed: Mar. 13, 2019

(86) PCT No.: PCT/EP2019/056251
§ 371 (c)(1),
(2) Date: Sep. 11, 2020

(87) PCT Pub. No.: WO2019/175219
PCT Pub. Date: Sep. 19, 2019

(65) Prior Publication Data
US 2021/0007538 A1     Jan. 14, 2021

(30) Foreign Application Priority Data

Mar. 14, 2018  (EP) .................................... 18161841
Dec. 20, 2018  (EP) .................................... 18214480

(51) Int. Cl.
| A47J 31/36 | (2006.01) |
| A47J 31/06 | (2006.01) |
| A47J 31/40 | (2006.01) |
| A47J 31/46 | (2006.01) |

(52) U.S. Cl.
CPC ....... *A47J 31/3628* (2013.01); *A47J 31/0673* (2013.01); *A47J 31/407* (2013.01); *A47J 31/468* (2018.08)

(58) Field of Classification Search
CPC . A47J 31/0673; A47J 31/3628; A47J 31/3695
(Continued)

(56) References Cited

U.S. PATENT DOCUMENTS

| 5,402,707 A | 4/1995 | Fond et al. |
| 6,079,315 A | 6/2000 | Beaulieu et al. |

(Continued)

FOREIGN PATENT DOCUMENTS

| CN | 1842290 A | 10/2006 |
| CN | 101953634 A | 1/2011 |

(Continued)

OTHER PUBLICATIONS

Russian Office Action for Russian Appl No. 2020132027 dated Jul. 15, 2022.
(Continued)

*Primary Examiner* — Reginald Alexander
(74) *Attorney, Agent, or Firm* — K&L Gates LLP

(57) ABSTRACT

The invention relates to beverage extraction unit (1) for extracting a beverage from an exchangeable capsule (2) containing beverage ingredients and being configured for operating according to two beverage extraction modes, e.g. at respectively high pressure or low pressure. The invention also relates to the beverage machine comprising the extraction unit.

16 Claims, 10 Drawing Sheets

(58) Field of Classification Search
USPC .......................................................... 99/295
See application file for complete search history.

(56) References Cited

U.S. PATENT DOCUMENTS

| | | | | |
|---|---|---|---|---|
| 6,792,980 | B1 * | 9/2004 | Cortese | A47J 31/3628 |
| | | | | 141/330 |
| 7,028,604 | B2 * | 4/2006 | Cortese | A47J 31/3628 |
| | | | | 99/302 R |
| 7,883,733 | B2 * | 2/2011 | Cortese | A47J 31/3633 |
| | | | | 426/597 |
| 8,720,320 | B1 * | 5/2014 | Rivera | A47J 31/0678 |
| | | | | 99/295 |
| 2011/0183055 | A1 * | 7/2011 | Mariller | A47J 31/3695 |
| | | | | 426/433 |
| 2017/0135516 | A1 | 5/2017 | Fantappie | |

FOREIGN PATENT DOCUMENTS

| | | | |
|---|---|---|---|
| CN | 105559586 | A | 5/2016 |
| EP | 0870457 | A1 | 10/1998 |
| JP | 2007501031 | A | 1/2007 |
| JP | 2012515601 | A | 7/2012 |
| JP | 2014515283 | A | 6/2014 |
| JP | 2018504172 | A | 2/2018 |
| WO | 2010029512 | | 3/2010 |
| WO | 2011061126 | | 5/2011 |
| WO | 2013114294 | | 8/2013 |
| WO | 2016033702 | | 3/2016 |
| WO | 2016071794 | | 5/2016 |
| WO | 2016075316 | A1 | 5/2016 |
| WO | 2018026271 | A1 | 2/2018 |
| WO | 2018026273 | | 2/2018 |

OTHER PUBLICATIONS

March Office Action for Appl Serial No. 2020-546493 dated Mar. 20, 2023.

Japanese Office Action for Japanese Appl No. 2020-546493 dated Mar. 28, 2023.

Chinese Office Action for Appl No. 201980014808.6 dated Nov. 7, 2023.

* cited by examiner

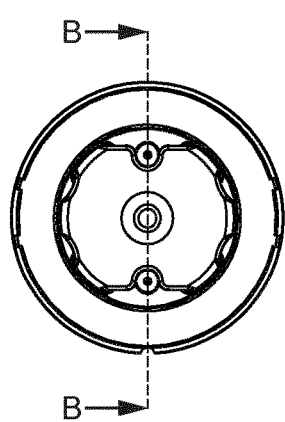
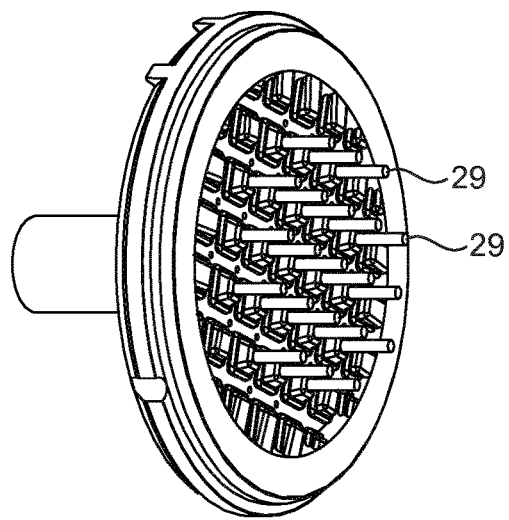
FIG. 11　　　　FIG. 12
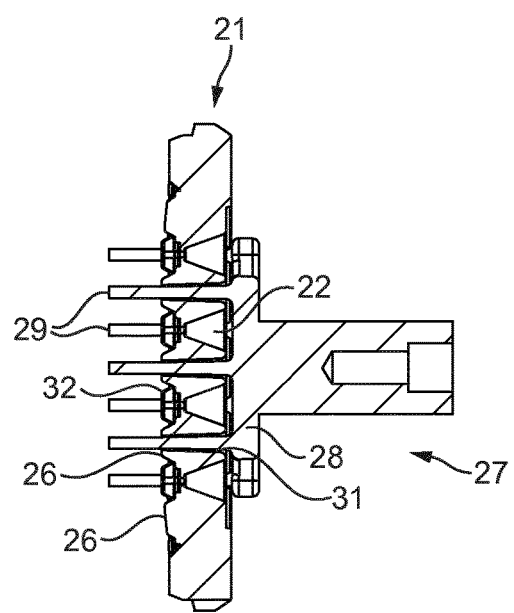
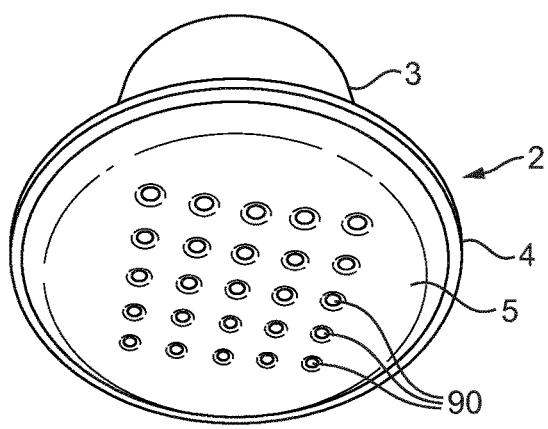
FIG.13　　　　FIG.14

BEVERAGE EXTRACTION UNIT FOR SELECTIVELY PROVIDING ORIFICES OF DIFFERENT TYPES IN A CAPSULE FOR EXTRACTION OF THE BEVERAGE

CROSS REFERENCE TO RELATED APPLICATIONS

The present application is a National Stage of International Application No. PCT/EP2019/056251, filed on Mar. 13, 2019, which claims priority to European Patent Application No. 18161841.4, filed on Mar. 14, 2018 and European Patent Application No. 18214480.8, filed Dec. 20, 2018, the entire contents of which are being incorporated herein by reference.

FIELD OF THE INVENTION

The invention relates to the field of beverage extraction using an exchangeable portioned container or capsule in a beverage extraction unit. In particular, it relates to an improved extraction unit which can extract beverage ingredients contained in a capsule such as roast-and-ground coffee in particular according to different possible modes of extraction involving high or low pressures depending on the selected mode.

BACKGROUND

The preparation of a beverage by extraction of coffee contained in a capsule containing a dose of roast-and-ground coffee is well known. The dose is generally determined for a single or double-serve.

EP0512468 relates to a capsule with a cup-shaped body and a tearable beverage outlet membrane. The membrane is generally a thin aluminium membrane that tears against a tearing extraction plate of a beverage extracting device such as described in EP0512470.

EP0512470 relates to a system for extracting a beverage using a beverage extraction unit with a tearing extraction plate comprising multiple relief elements and channels in-between (called a "flow grille and relief surface element") which is adapted to receive a sealed capsule, to introduce water under pressure via a water injector into the capsule, to deform the outlet membrane or cover (e.g. an aluminium membrane) and to tear it under the effect of pressure of the liquid rising in the capsule to allow the beverage to be released from the capsule.

EP0602203 relates to a sealed flexible sachet in the form of an individual portion adapted to be extracted under pressure containing at least one powdered substance for the preparation of a beverage such as roast-and-ground coffee; the sachet comprising two identical flexible sheets of circular, oval or polygonal shape, which provide between one another a space for the substance and are sealed over their periphery so that the sachet is substantially symmetrical with respect to its plane of sealing, the sachet being opened under the effect of the increase in pressure in the sachet when the extraction fluid is injected.

EP0870457 relates to an extraction unit similar to as EP0512470, but adapted for a closed impermeable sachet containing beverage substance such as described in EP0602203. The device comprises an upper member comprising means intended to perforate the upper surface of the sachet and permit introduction of water into the sachet, a lower member which has a receptacle for accommodation of the capsule and raised and hollow portions; wherein the extraction surface of the sachet is drawn progressively and locally against the relief and hollow portions; the extraction surface tearing in multiple locations according to a path which is predetermined by the location of the relief and hollow portions and reaching its rupture tension there, in order to permit the flow of the liquid after extraction. The lower portion generally comprises flow apertures to permit the beverage to flow there-through. The relief and hollow portions are preferably under the form of truncated pyramids separated by a network of channels.

Therefore, the beverage extraction systems of the prior art generally utilize an exchangeable container, e.g. capsule, sachet or pod, comprising a tearable beverage outlet membrane, e.g. a thin aluminium foil, which can be torn only when a sufficient deformation of this membrane has occurred against the relief elements of the tearing extraction plate. The tearing generally occurs at the edges of the relief elements which are generally multiple small truncated pyramids or rectilinear ridges. The tearing results in the creation of small orifices along the edges of these protrusions or relief elements. These orifices are relatively small (e.g. 0.1-1.0 mm long and 0.1-0.3 mm wide) and generally the outlet membrane at least partially conforms to the top and upper side of the relief elements so reducing even more the flow opening area. As a result, the pressure drop is relatively high at this interface. Furthermore, filtering of the beverage particles occurs at this confined interface which is an advantage since no additional filter is necessary inside the capsule. This geometry of extraction therefore corresponds to what can be generally called a geometry of an extraction plate with relief elements in the present application. The flow of beverage is then collected in the channels and drained through small openings of well-defined dimensions in the channels.

A relatively high pressure of water entering the capsule is required to deform the membrane and to open it because the beverage substance, generally roast-and-ground coffee is confined and tends to swell when wetted and to compact against the outlet membrane due to pressure thereby creating a high resistance to water flow in the capsule. As a result, the required pressure of water at the entry of the brewing chamber for tearing the outlet membrane can rise up to 7-12 bar and the pressure even continues to rise after opening of the membrane because the coffee continues to compact and the flow openings at the interface between the torn membrane and the tearing plate of the device become even smaller. Furthermore, fine coffee particles (i.e. particles smaller than 100 μm) have a tendency to settle against the outlet membrane and may partially clog the orifices. Therefore, after breaking the delivery membrane, the water pressure during extraction of the beverage continue to increase. The high shear at the interface promotes the generation of a thick foam with tiny bubbles ("crema") on top of the coffee.

Therefore, the devices of the prior art adapted for extracting short or medium-size coffee volumes (ristretto, espresso or lungo) from a capsule are not well adapted to extract long beverage volumes because the flow through the capsule and the extraction plate is too slow and an over-extraction of the beverage is typically obtained that tends to deliver bitter aromatic notes. Therefore, the devices of the prior art are essentially suitable for extraction of short to medium-size coffees with 'crema'.

Other documents of the prior art are discussed in the following parts.

US2017280921 relates to a beverage extracting device with an improved extraction function comprising an extracting part including an installing space in which a beverage capsule is installed; an opening and closing part connected to the extracting part for opening or sealing the installing space; a link part connected to at least one between the extracting part and the opening closing part; and a perforating part moving reciprocally so as to perforate the beverage capsule due to the movement of the link part.

CN201743493U relates to a device for extracting drink from a capsule comprising a brewing cup and a nozzle; a piercing device hinged in the brewing cup driven by an elastically biased push rod. The piercing device can retract after piercing the capsule so as to avoid clogging of a piercing opening and increase the flow rate of coffee.

WO2010029512 relates to an improvement to devices of the prior art which consists in progressively puncturing the membrane of the capsule. The device comprises a water inlet, a capsule holder, a capsule cage, clamping means and a set of spikes for piercing the membrane wherein the clamping means comprises a clamping piston mounted such that it can move with respect to the cage. When water is filled in the cage, water under pressure moves the clamping piston which drives the set of spikes upwardly towards the membrane to puncture the membrane. Therefore, the set of spikes is moved by the clamping piston depending on the pressure exerted in the extraction chamber. As a result, there is only a single mode of extraction and the spikes just help to more progressively puncture the membrane.

WO2013114294 relates to a puncture needle for a beverage preparation device for extracting a dose, e.g. of ground coffee, contained in a capsule comprising an extraction membrane; the puncture needle being intended to be movably mounted relative to a capsule holder and characterized in that it comprises on the lateral face thereof, at least one gutter-shaped channel suitable for the flow of the beverage. The invention also relates to an assembly formed from at least one such puncture needle and a capsule holder being formed from a plate provided with ports, each of the ports being designed to receive a puncture spikes. The edge of each port comprises an inclined plane oriented towards the outside of the capsule holder. The extraction spike and the capsule holder are designed to avoid to cut the membranes in several pieces which could be entrained by the coffee/water mixture and would constitute foreign bodies in the beverage. As in WO2010029512, the spikes are moved by a clamping piston depending on the pressure exerted in the extraction chamber.

WO2018026271 relates to a system for preparing a broader range of beverage from either a first exchangeable capsule or second exchangeable capsule of different sizes with the same apparatus as compared to an apparatus which can only process exchangeable capsules of substantially one size. The system for preparing quantity of beverage suitable for consumption includes a first exchangeable capsule with a first exit face and a second exchangeable capsule with a second exit face, the second exit face having a larger diameter than the first exit face. The system includes an apparatus including an extraction plate having a plurality of relief elements for selectively engaging one of the first and second exit faces, and a fluid dispensing device for supplying an amount of water under pressure to a selected one of the exchangeable capsules, so as to press its exit face onto the relief elements, for opening the exit face. The extraction plate may include a central portion and a peripheral portion and the central portion may be movable relative to the peripheral portion to selectively adapt to the first or second exchangeable capsule.

Therefore, there would be a need for a versatile but yet simple beverage extraction unit for preparing a broader range of beverages from a same beverage exchangeable capsule.

There would also be a need for an extraction unit which can provide, e.g. depending on the choice of the user, either high pressure extraction such as for delivering short beverage extracts or lower pressure extraction such as for delivering lighter (e.g. filter-like) and/or longer or beverage and/or beverages having different aromatic profiles and/or different foam characteristics (e.g. more or less beverage crema). The preferred beverage is preferably a coffee extract extracted from roast-and-ground coffee although other beverage extracts from additional or other ingredients or raw materials can be contemplated.

SUMMARY OF THE INVENTION

The invention relates to a beverage extraction unit for extracting a beverage from an exchangeable portioned capsule containing beverage ingredients, preferably an extractible substance, more preferably essentially roast-and-ground coffee, comprising a liquid entry wall and a beverage outlet membrane, optionally the capsule having a circumferential flange to and/or at which the beverage outlet member is sealed to and/or at the flange.

The unit comprises:
a frame,
an injection part for accommodating the liquid entry wall of the capsule and comprising at least a water inlet for injection of water in the capsule,
an extraction part arranged for closing with the injection part to form an extraction chamber, optionally the extraction part closing with the injection part at the above mentioned flange (when present);
wherein the extraction part comprises an extraction plate having outlets for draining the liquid beverage extract and a plurality of relief elements configured for providing orifices of a first type in the outlet membrane as a result of the outlet membrane pressed onto the relief elements under pressure of water supplied in the extraction chamber;
wherein the extraction part further comprises a plurality of piercing elements configured for providing orifices of a second type in the beverage outlet membrane;
wherein the piercing elements are arranged in a moveable manner relatively to and through the extraction plate between:
a deployed, e.g. extended, position in which the piercing elements extend, e.g. towards the injection part, beyond the relief elements of the extraction plate for providing orifices of the second type in the outlet membrane of a capsule enclosed in the extraction chamber; and
a retracted position in which the piercing elements are so retracted relative to their deployed position that the relief elements extend, e.g. towards the injection part, beyond the piercing elements or at least substantially to a level of the piercing elements.

In the present beverage extraction unit, the advantage is that a lower pressure of extraction can be obtained by the orifices of the second type in the outlet membrane while a higher pressure of extraction can be obtained by the orifices of the first type in the outlet membrane under pressure. The orifices of the first type can be obtained by maintaining the piercing elements in the retracted position from closure of the unit to the end of the extraction. The lower pressure of extraction can be further obtained by moving the piercing elements in retracted position after the orifices of the second type have been obtained in the outlet membrane to ensure the orifices are unhindered by the piercing elements. The orifices of the second type provided by the piercing elements are such that they prevent the rise of pressure required for providing the orifices of the first type by the relief elements.

Preferably, in the retracted position of the piercing elements, the piercing elements are positioned relatively offset to or flush with the relief elements and in the deployed, e.g. extended, position, the piercing elements protrude beyond the relief elements thereby creating a series of orifices in the outlet membrane when the container is enclosed in the extraction chamber.

Typically, in the retracted position of the piercing elements, the orifices of the first type are formed by hydraulically urging together the relief elements and the outlet membrane onto the relief elements, e.g. by raising a pressure in the capsule to inflate and tear and/or break and/or cut the membrane against the relief elements.

Typically, in the deployed position of the piercing elements, the orifices of the second type are formed by the piercing elements by introducing the piercing elements into the outlet membrane by mechanically urging together the outlet membrane and the piercing elements, e.g. by mechanically pushing and/or pulling the (normally entire) capsule and the piercing elements together.

The extraction unit may be configured to operate the piercing elements in one or more modes selected from:
- a mode to maintain the piercing elements stationary from a beginning to an end of an extraction of said ingredient in such capsule in the extraction chamber, for instance the piercing elements being moved inwards and/or outwards of the extraction chamber before a beginning of the extraction of said ingredient or being maintained outwards such that such capsule is prevented from being exposed to the piercing elements until the end of the extraction;
- a mode to move the piercing elements inwards and optionally outwards of the extraction chamber before a beginning of an extraction of said ingredient in such capsule when such capsule is in the extraction chamber; and
- a mode to maintain the piercing elements outwards of the extraction chamber during a beginning of an extraction of said ingredient in such capsule and then to move the piercing elements inwards and then optionally to move the piercing elements outwards of the extraction chamber (8), the ingredient being for instance prewetted without outflow of beverage during the beginning of the extraction.

The design of the relief elements can be chosen to obtain orifices of the first type in the outlet membrane solely under pressure conditions after water is injected in the extraction chamber. The relief elements may be truncated pyramids and/or portions of ridges separated by channels with the outlets.

The design of the piercing elements can be chosen to provide orifices of the second type in the outlet membrane when the outlet membrane is placed adjacent to the extraction plate, in particular, when it is pressed to the extraction plate when the extraction part is closed with the injection part to form the extraction chamber.

The orifices of the second type may be obtained already in the extended position of the elements in the brewing chamber when a capsule is present before water is injected in the extraction chamber or possibly at low pressure (e.g. 0.5-2 bar) when water is injected. The piercing elements may be needles, pins and/or blades. The more specific advantage of needles or pins is that they provide well-defined orifices in the outlet membrane thereby ensuring a more consistent flow during beverage extraction.

Typically, each piercing element has a smaller piercing cross-section than the cross-section of the relief elements and the total number of piercing elements is equal or less than the number of relief elements. As result, the force required to pierce orifices of the second type is lower than the force required for providing the orifices of the first type. For instance, the piercing elements, such as needles, have piercing end surfaces of preferably less than 2 $mm^2$, more preferably 1.8 $mm^2$, most preferably between 0.5 and 1 $mm^2$, for example about 0.8 $mm^2$. The piercing elements may have a circular or with a diameter comprised between 1.6 and 0.8 mm, most preferably about 1.0 mm. The number of piercing elements can be between 5 and 35 such as 10 and 30, e.g. 15 and 25. As a result, a total opening surface area of the orifices obtained by the piercing elements can be between 2.5 $mm^2$ and 65 $mm^2$, for instance between 5 and 55 $mm^2$, for example about 10-30 $mm^2$, e.g. 5 to 25 $mm^2$.

The relief elements can have relatively rectilinear edge portions extending in the transversal direction of the extraction chamber. The relief elements may rather provide a tearing effect on the membrane that can occur only when a sufficient pressure is established whereas the piercing elements provide a piercing of the membrane preferably before extraction or at a pressure lower than the pressure required for providing the orifices of the first type with the relief elements. For example, the ratio of the number of piercing elements to the number of relief elements is between 1:2 and 1:1.1 or 1:1. The extraction plate may comprise between 30 and 50 relief elements, such as 25 relief elements e.g. in the shape of truncated pyramids arranged as a grid with channels in-between.

In the extended position, the piercing elements can be arranged through the extraction plate to traverse relief elements. The relief elements traversed by a piercing element may comprise a free end with substantially transversally flat surface comprising a passage for allowing the exit of the piercing needle. An advantage can be that the position of the piercing element does not obstruct the channels preferably positioned between the relief elements. The channels and the outlets in the channels may thereby be maintained unhindered. As a result, a good evacuation of the beverage may always be provided.

For instance, when the piercing elements are fewer than the relief elements, not all relief elements are traversed by a piercing element. The piercing elements can be arranged in the centre of the extraction plate and the periphery of the extraction plate has no or fewer piercing elements. The periphery of the extraction plate where relief elements are present may be devoid of piercing element traversing the relief elements.

The extraction plate can be of non-variable larger transversal dimension, i.e. of fixed diameter. The extraction plate may form a rigid, non-moving support for the outlet membrane of the capsule. The extraction plate may comprise a peripheral support portion without relief elements for supporting at least part of the above mentioned flange (when present) of the capsule when the latter is enclosed in the extraction unit with the injection part pressing the flange of the capsule.

The plurality of the piercing elements may be part of a piercing member arranged to be moveable relatively to the extraction plate between the extended position and the retracted position of the piercing elements and comprising a support plate from which extends the piercing elements. The piercing elements can be attached to the support plate in stationary or spring-biased fashion. This configuration can be compact and simple to implement and/or can reliably provide, by its relative positioning with respect to the extraction plate, two different extraction modes, i.e. a low pressure extraction mode and a higher pressure extraction mode. The extraction part may also comprise more than one piercing member, e.g. two piercing members with same or different piercing elements. The piercing members may be arranged to be movable independently or jointly relative to one another. The advantage is that different possible modes of extraction can be obtained by selecting the piercing member(s) and so varying the number of orifices of the second types in the outlet membrane.

In an aspect of the invention, the support plate of the piercing member extends behind the extraction plate. The support plate can be positioned at the opposite face of the face of the extraction plate which has the relief elements. This arrangement is particularly compact and enables simpler kinematics between the retracted and extended positions. The piercing member can be arranged to move in an at least substantially translational and axial direction relative to the extraction plate. An axial and translational movement may be simple and may reduce a risk for blockage. The term "axial" typically refers to the main direction of extension of the extraction chamber between the injection part and the extraction part. This direction can be generally perpendicular to the transversal direction of the extraction plate. However, other arrangements are possible such as a helically or rotationally moving arrangement of the piercing member relative to the extraction plate.

The extraction unit may have a drive member configured to operate the piercing member and/or the extraction plate in relative movement between the retracted position and the extended position of the piercing elements. The drive member may operate the piercing member and/or the extraction plate independently from the pressure exerted in the extraction chamber.

The beverage extraction conditions may be chosen by a selection of either the relief elements or the piercing elements to change the type of orifices in the membrane and consequently the pressure and flow conditions through the outlet membrane of the capsule.

The piercing member can be mobile and the extraction plate can be stationary relative to the frame. The piercing member may perforate the outlet membrane as it is moved from its retracted position to its extended position. It may provide greater flexibility to control the size of the orifices through the outlet membrane.

The extraction unit can provide at least two different extraction modes, for instance: one mode in which the orifices of the first type are formed in the outlet membrane thereby providing a high-pressure beverage extraction and a second mode in which the orifices of the second type are formed in the outlet membrane thereby providing a relatively lower pressure beverage extraction.

The drive member may comprise any one of: a solenoid piston, a hydraulic piston, or stepped motor arrangement. The drive member is preferably fixed to the frame and/or to the extraction part.

The invention further relates to a beverage machine comprising a beverage extraction unit as described above and/or in the appended claims. The machine comprises a pump for supplying water to the extraction unit (in particular to the injection part) and a control unit configured for controlling the drive member to move the piercing member relative to the extraction plate between the extended position and the retracted position of the piercing elements.

The control unit may operate the drive member to drive the piercing member back in retracted position before activating the pump for supplying water or shortly after, for instance after a period of less than 5 seconds, such as less than 3 seconds after starting the activation of the pump. The beverage flow through the orifices of the second type created in the beverage outlet membrane may be less hindered which results in relatively lower pressures and higher flow rates which may be advantageous for delivering large volume beverage extracts.

Furthermore, the beverage machine may comprise mode selection means comprising at least a high-pressure extraction mode in which the control unit operates the pump to supply water to the extraction unit while maintaining the piercing member in retracted position to provide orifices of the first type and a lower-pressure extraction mode in which the control unit operates the drive member to drive the piercing member in extended position of the piercing elements to provide the orifices of second type in the outlet membrane before operating the pump for supplying water to the extraction unit.

The mode selection means may include a user interface, such as selection switches or a touch screen or similar devices. The mode selection means may include a capsule identification system which comprises a capsule identification device such as an optical code reader (e.g. an IR reader) capable of identifying a capsule and enabling a determination of the mode at which the extraction unit can advantageously be operated. The capsule may include an identifier identifiably by the capsule identification device such as barcode(s), recognizable colour(s), invisible-ink printed element(s), a radio-frequency tag(s), a shape element, magnetic or inductive element(s) and combinations thereof. The user can be relieved of the burden to select the proper mode adapted to the type of container so as to facilitate a beverage preparation.

The beverage machine may further comprise water heating means for heating water before it is supplied to the extraction unit. The water heating means may be controlled by the control unit to heat water at suitable extraction temperature(s). The temperature(s) may be controlled according to the mode selected by the mode selection means and/or according to other parameters e.g. the type of beverage ingredient, e.g. coffee blend, contained in the container. The advantage is that beverage can be extracted more effectively and/or with more variations.

In order to reduce the amount of coffee 'crema' in the lower pressure mode, the control unit may operate the pump at a pressure or pressure range (P2) for the lower pressure mode which can be lower than the pressure or pressure range (P1) for the high pressure mode. The pressure can be reduced by reducing the electrical power or frequency or voltage or current supplied to the pump so as to cause a reduction of the water and/or beverage flow rate. For instance, the electrical power or frequency or voltage or current reduction may be controlled by the control unit monitoring the flow rate measured by a water flow sensor, e.g. a flow meter, relative to at least one water flow rate set point. Alternatively or additionally, the power or frequency or voltage or current reduction can be monitored by the control unit monitoring the water pressure supplied to the extraction unit such as via a pressure sensor relative to at least one water pressure rate set point. For a solenoid water pump, for instance, the control unit is configured to control a waveform of electrical energy supplied to the pump and chops a portion of a period of a repeating unit of the waveform of the electrical energy supplied to the pump. The method is described for instance for noise reduction of the pump in WO2017/005618 but can be applied in a substantially linear manner with respect of time here to lower the electrical energy during extraction.

For enhancing the automation of the machine, the beverage machine may comprise a motorized drive assembly for closing the injection part with the extraction part. Typically the control unit is configured for operating the motorized drive assembly between an opening position of the extraction unit and a closed position of the extraction unit and is configured for operating the piercing member in extended position for providing orifices of the second type in the outlet membrane in the closed position of the extraction unit e.g. when the low pressure mode is selected by the selection means. The advantage lies in the automatic closing and opening of the beverage machine and the automatic selection of the beverage extraction modes and the automatic control of the piercing member. The operations of the beverage machine can be facilitated when the closing of the beverage machine automatically triggers the selection of the beverage extraction mode.

Another aspect of the invention relates to a use of an exchangeable capsule containing beverage ingredients for extraction in the extraction chamber of: the extraction unit as described above or the beverage machine as described above, the capsule comprising a liquid entry wall and a beverage outlet membrane. For example, the capsule has a circumferential flange to and/or at which the beverage outlet membrane is sealed A further aspect of the invention relates to a beverage preparation system comprising a beverage machine or an extraction unit as described above and an exchangeable capsule containing beverage ingredients and comprising a liquid entry wall and a beverage outlet membrane. For example, the capsule has a circumferential flange to and/or at which the outlet membrane is sealed.

The values of pressure are typically measured downstream a pump and upstream the water inlet, e.g. in the fluid line between the water inlet and the pump. The pressure in the extraction chamber or in the capsule may possibly be reduced compared to such measured pressure by the presence of a check valve, e.g. at the water inlet of the injection part, and/or restrictions provided in the water inlet of the injection part or by piercing members engaged in the entry wall of the capsule and/or by the ingredient in the capsule and/or other obstacles.

BRIEF DESCRIPTION OF THE DRAWINGS

FIG. 11 is a perspective partial view of the extraction plate with the piercing member in the deployed position;

FIG. 12 is a planar front view of the extraction plate and piercing member associated therewith;

FIG. 13 is a cross-sectional view along plane B-B of the extraction plate and piercing member associated therewith;

FIG. 14 shows an exchangeable capsule with a multitude of orifices 90 of the first type after extraction according to the low pressure mode;

DETAILED DESCRIPTION OF THE INVENTION

Figure 1:
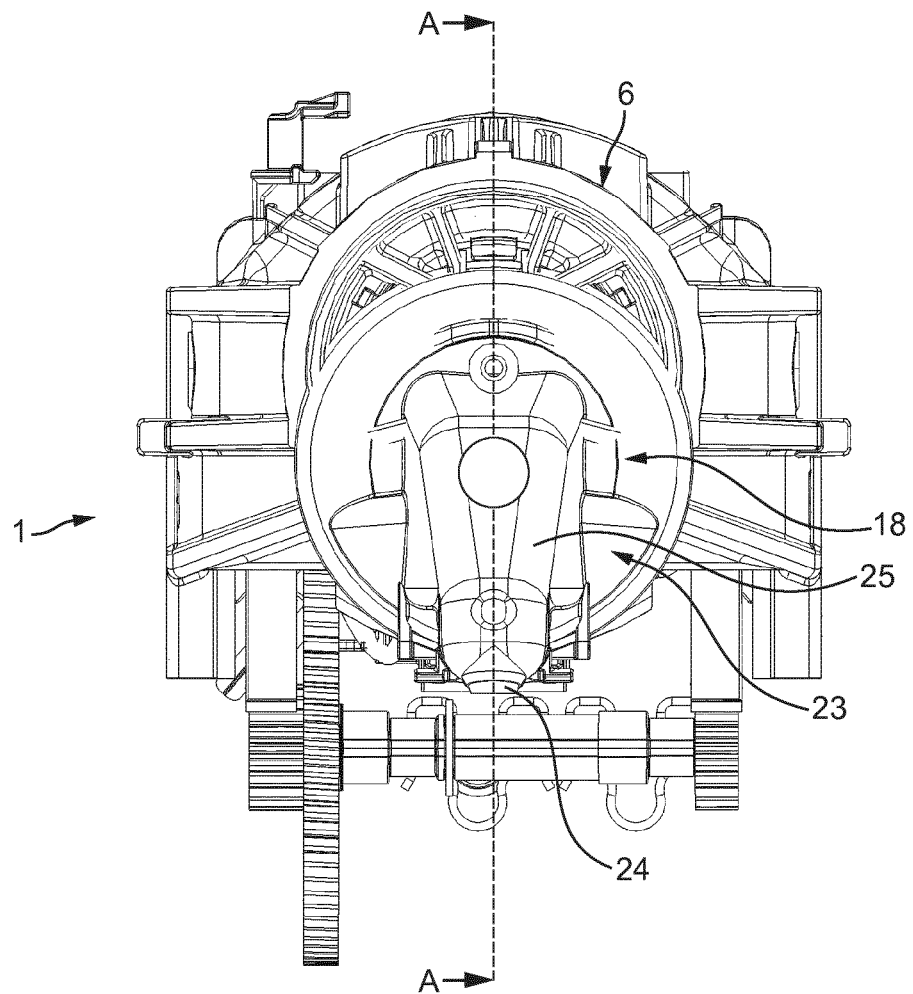
FIG. 1 is a front planar view of the extraction unit according to a preferred embodiment of the invention.
Figure 2:
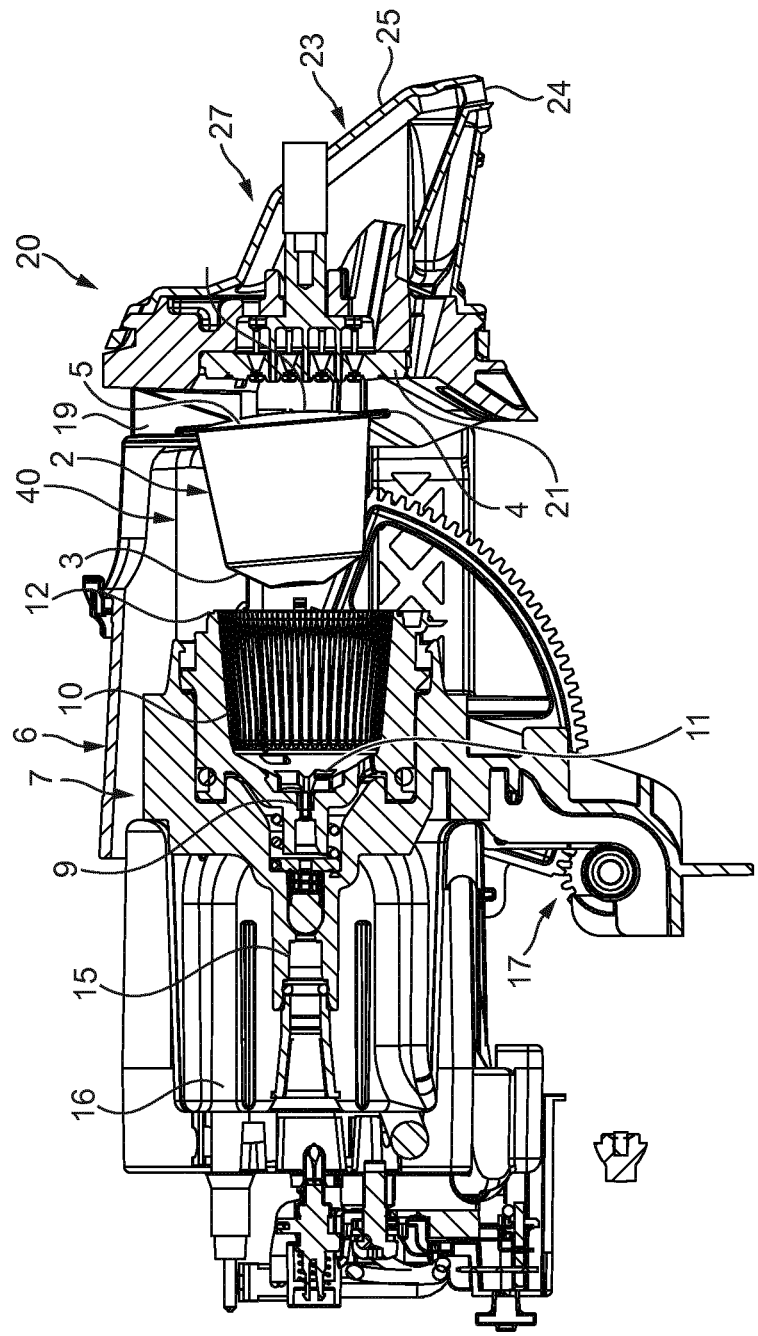
FIG. 2 is a cross-sectional view along plane A-A of FIG. 1 of the extraction unit of the invention in particular in open position of the unit.
Figure 3:
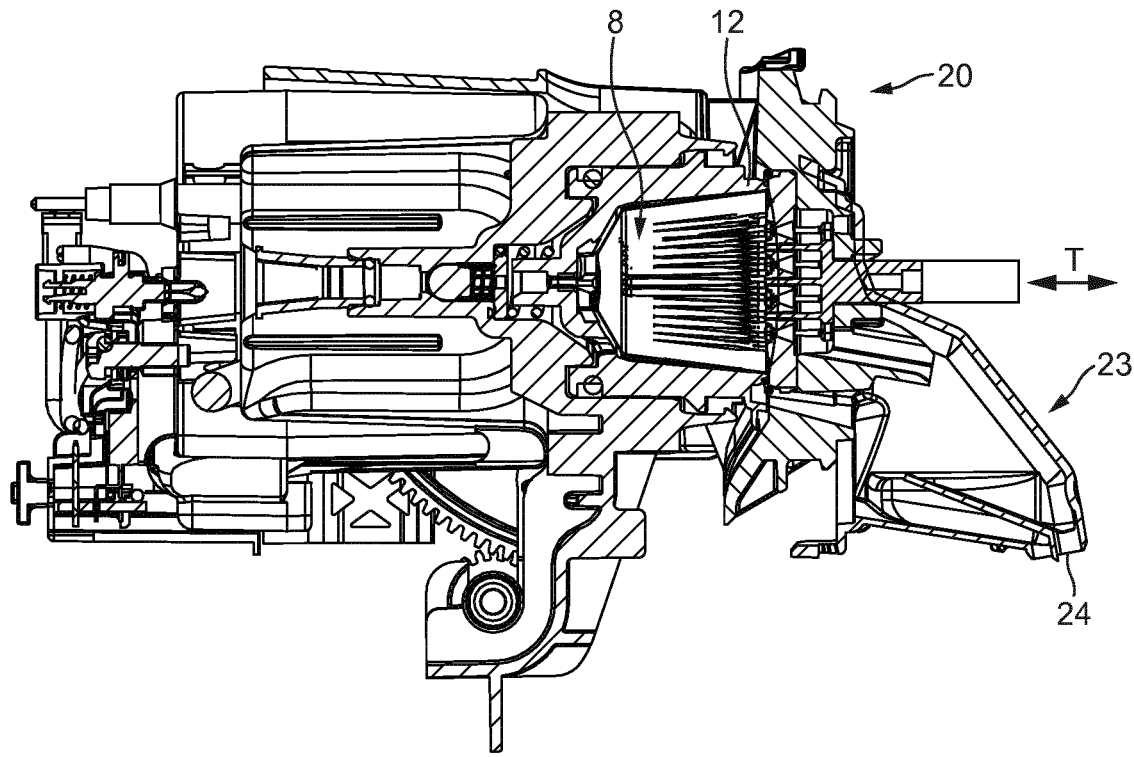
FIG. 3 is a cross-sectional view of the extraction unit in closed position of the unit and in retracted position of the piercing member.
Figure 4:
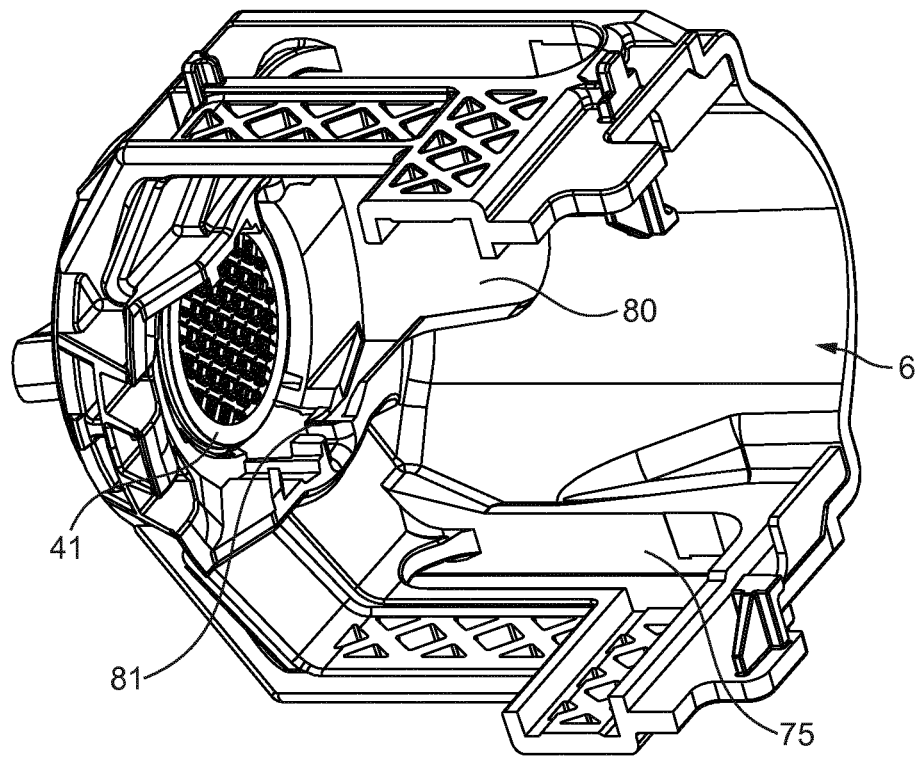
FIG. 4 is a perspective partial view of the extraction unit showing in particular the extraction part with the piercing member in retracted position of FIG. 5.

An example of the extraction unit 1 of the present invention is described in general manner in relation to FIGS. 1 to 3. The unit is arranged for receiving an exchangeable capsule 2 containing portioned ingredients such as roast-and-ground coffee.

In the present example, the capsule is a beverage capsule with a relatively rigid cup closed by a flexible outlet membrane. In possible variants, the extraction unit could also be configured to receive a capsule formed as a flexible pod or sachet. A pod would generally be formed of flexible walls. A typical example of exchangeable capsule comprises a liquid entry wall 3, circumferential flange 4 and a beverage outlet membrane 5. The capsule may contain a dose of roast-and-ground coffee. The beverage outlet membrane 5 can be impervious to liquid and must be perforated or torn to let beverage pass through it. The beverage outlet membrane may be formed of aluminium or a laminate of paper-polymer, paper-aluminium or aluminium-polymer-paper. A beverage capsule may have a cup-shaped body forming the liquid entry wall and the flange onto which the beverage outlet membrane is welded. For example, the outlet membrane may be 30 to 50 μm thick, e.g. about 40 μm thick. (The thickness is normally determined without considering a possible embossing pattern). A pod may comprise two flexible walls sealed at a flange. The pod may be symmetrical along the plane of the flange thereby providing the possibility to extract the beverage from any one of the two walls. Therefore, one wall forms the entry wall and the other wall forms the beverage outlet membrane depending on the orientation of the pod in the beverage extraction unit.

The extraction unit comprises a frame 6, an injection part 7 and an extraction part 20.

The injection part 7 is arranged for accommodating the liquid entry wall 3 of the capsule and for supplying water in an extraction chamber 8 when the beverage extraction unit is closed as illustrated in FIG. 3. The injection part comprises at least one water inlet 9 for injection of water. The injection part may include a cage 10 forming a cavity for receiving the liquid entry wall and may comprise perforating members 11 for perforating the liquid entry wall 3 of the capsule. The perforating members 11 may be blades or needles projecting from the bottom of the recess 10. At the front end of the cavity 10 is provided a circumferential pressing edge 12 for closing the extraction chamber 8 onto the flange 4 of the capsule and pressing the flange against the extraction part 20. The extraction chamber 8 can be delimited by the cavity of the cage 10 of the injection part up to pressing edge 12, pressure being exerted on the capsule's outlet membrane 5 adjacent extraction part 20. The extraction unit generally comprises a water line 15 for supplying water to the water inlet 9. A water heater 16 may be provided to the extraction unit to heat water to a suitable temperature for extracting the beverage ingredient of the capsule. The injection part 7 of the unit may be provided with a cavity adapted for capsules of same flange diameter. The flange diameter may be used to determine the compatibility of the capsule which is pressed by the injection part against the extraction part. However, the injection part can also be arranged in an expandable manner to adapt the extraction chamber to capsules of different diameters and/or lengths such described in EP2906092, EP2906093 or EP2908706.

In this embodiment, extraction part 20 can be mounted in a moveable manner relative to the frame 6 so as to move between an open position (FIG. 2) and a closed position (FIG. 3) in which the extraction chamber 8 is formed. The extraction part 20 may be laterally guided in the frame such as by guiding rails 75 and the like. Extraction part 20 may be driven between the two positions by a motorized or manual driving assembly 17. Further details of a configuration of such a type can be found in WO 2012/025258, WO 2012/025259, WO 2012/093108 and WO 2013/127476. It is of course possible to mount the injection part in a movable manner relative to the frame. Both injection and extraction parts may be moveable relative to the frame or only one of the injection and extraction parts may be moveable relative to the frame.

Figure 6:
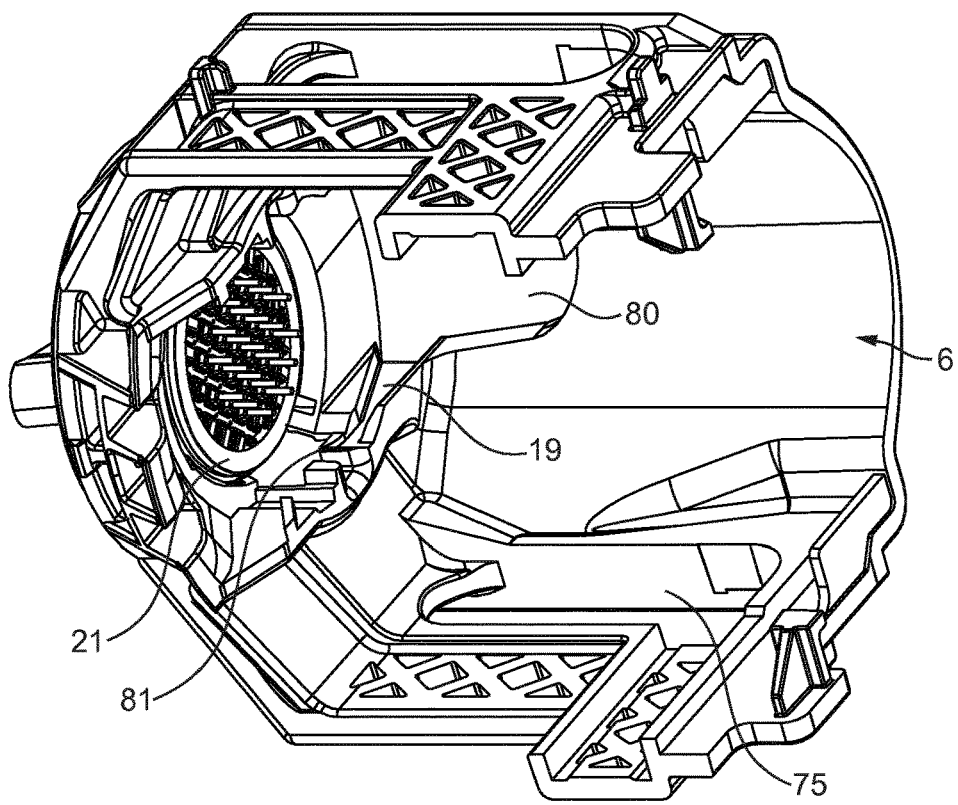
FIG. 6 is a perspective partial view of the extraction unit showing in particular the extraction part with the piercing member in the deployed position of FIG. 5.

In the open position, the extraction part 20 is distant from the injection part 7 to allow the capsule to be inserted in the extraction unit in an insertion passage 40. For this, the frame may comprise a slide arrangement 19 (e.g. two lateral slide grooves). As apparent in FIG. 6, the frame may comprise a profiled opening 80 having a form adapted to the capsule for allowing the capsule to be inserted in the slide arrangement and to access to the passage. The frame may further comprise stop means 81, e.g. such as positioned in the slide arrangement, for stopping the capsule in the passage 40 when the extraction unit is in the open position as illustrated in FIG. 2 thereby allowing the injection part to receive the capsule in charge as the extraction unit is brought into the closed position. Other capsule loading systems can possibly be thought of.

Figure 5:
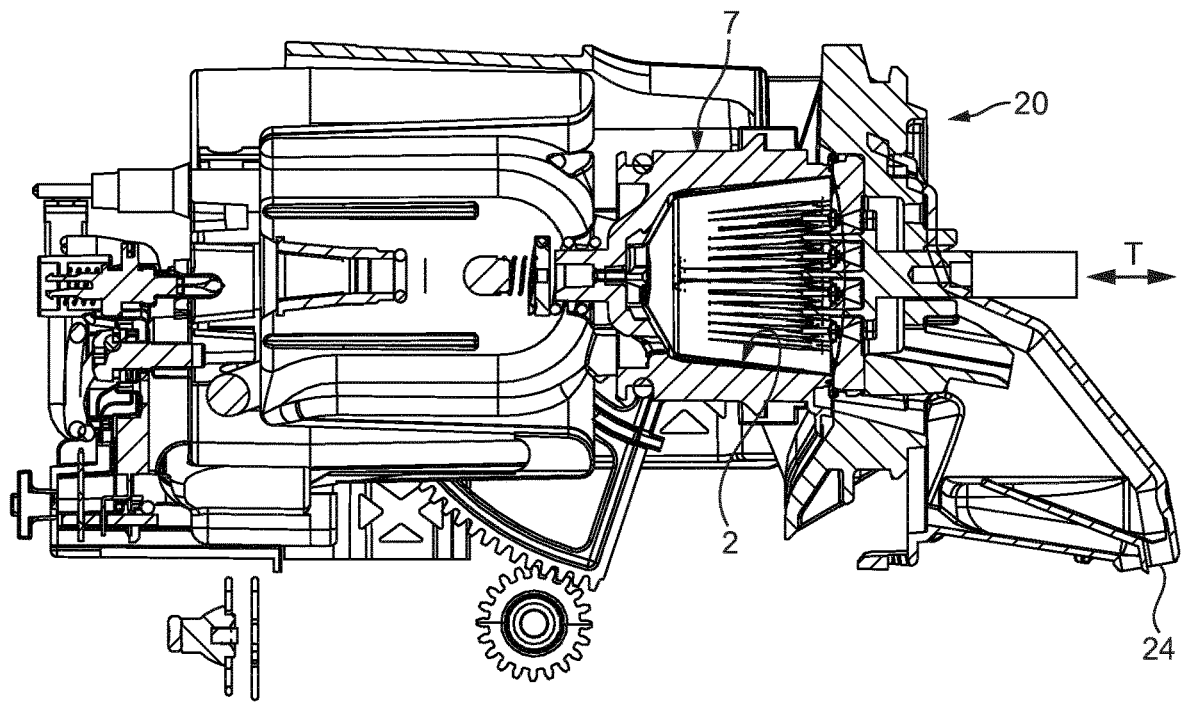
FIG. 5 is a cross-sectional view of the extraction unit in closed position of the unit and in a deployed position of the piercing member.

The extraction part 20 comprises an extraction plate 21 which is configured for interfacing with the beverage outlet membrane of the capsule in the closed position of the extraction unit. In The extraction plate can be arranged in such a manner that the outlet membrane is in contact with the extraction plate when the capsule is in place with the extraction unit in closed position of the injection part and extraction part (FIGS. 3 and 5). The extraction part has beverage outlets 22 for draining the liquid beverage extract when released from the capsule during extraction. The beverage outlets 22 can be provided through the extraction plate 21. The extraction part 20 may comprise a beverage collecting and dispensing member 23 downstream of the extraction plate 21 to collect the beverage extract from the beverage outlets. The collecting and dispensing member may comprise a beverage main outlet 24 for dispensing the beverage extract to a recipient such as a cup. The collecting and dispensing member may comprise part(s) which is (are) fixed or even part of the extraction plate and part(s) which is (are) distant from the extraction plate such as an outer cover 25. The collecting and dispensing member may comprise additional features such as a steam extractor, flow divider(s), additional collector and/or foam breaker(s).

The extraction plate 21 has a plurality of relief elements 26 which are configured for providing orifices of a first type in the outlet membrane. For example, the number and shape of the relief elements are determined for perforating, e.g. tearing, the outlet membrane of the capsule only at or above a certain pressure (also referred as the "opening pressure") when water is injected in the extraction chamber. The configuration of the extraction plate is such that the opening pressure is generally at or above 8 bar, more preferably within a range of 8 to 12 bar. The pressure also highly depends on the breaking resistance of the outlet membrane and so on the material(s) and the thickness of the outlet membrane.

The extraction plate may include a peripheral support portion 41 without relief elements 26 for supporting the flange of the capsule in place in the unit. The extraction plate can be of constant transversal dimension, i.e. fixed diameter. The extraction plate may be formed of a transversally rigid part, i.e. without axially moving peripheral part and/or central part. The extraction plate can be made of a substantially monolithic part. The extraction plate can be formed of a highly mechanically and heat resistant polyamide such as polyphthalamide (EMS-Grivory as brand name) or a similar material. To further increase its mechanical properties, the material of the extraction plate (e.g. polyphthalamide) may be filled with short glass fiber or another mechanical reinforcement filler.

The extraction part has piercing elements 29 which are movable relative to the extraction plate, e.g. through the extraction plate, between a retracted and a deployed, e.g. extended, position. The extraction part 20 may include a piercing member 27 which is moveably arranged relative to the extraction plate 21. The piercing member may comprise a support or base 28 from which extend a series of such piercing elements 29. The piercing elements can be, needles or pins. The piercing member can be made of the same material as the extraction plate.

The piercing member 27 is moveable between a retracted position visible in FIGS. 2, 3, 4, 7 and 9 and a deployed, e.g. extended, position visible in FIGS. 5, 6, 12 and 13. In the retracted position, the piercing elements can be inactive and the relief elements 26 extend beyond piercing elements 29 or at least substantially to a level of piercing elements 29 to interact with the outlet membrane. For this, the piercing elements are positioned relatively offset behind the free end of the relief elements. In the deployed position, the piercing elements are active and protrude beyond the free end of the relief elements. Preferably, the piercing elements protrude a sufficient distance (e.g. 1-2 mm) to provide orifices of a second type in the outlet membrane, e.g. by mechanical effect when the piercing elements are in the deployed position and the outlet membrane is positioned adjacent the extraction plate when the injection part is closed relative to the extraction part.

Extraction unit 1 may be configured to operate piercing elements 29 in one or more modes selected from:
- a mode to maintain piercing elements 29 stationary from a beginning to an end of an extraction of said ingredient in such capsule 2 in extraction chamber 8, for instance piercing elements 29 being moved inwards and/or outwards of the extraction chamber before a beginning of the extraction of the ingredient or being maintained outwards such that such capsule 2 is prevented from being exposed to piercing elements 29 until the end of the extraction;
- a mode to move piercing elements 29 inwards and optionally outwards of extraction chamber 8 before a beginning of an extraction of the ingredient in such capsule 2 when such capsule 2 is in extraction chamber 8; and
- a mode to maintain piercing elements 29 outwards of extraction chamber 8 during a beginning of an extraction of the ingredient in such capsule 2 and then to move piercing elements 29 inwards and then optionally be moved outwards of extraction chamber 8, the ingredient being for instance prewetted without outflow of beverage during an the beginning of the extraction.

The piercing member 27 can be mounted with the extraction plate to move in translational direction between the two positions. The translational direction (T) is preferably substantially aligned or parallel or at least not inclined more than 5-10 degrees to the axial direction (I) of the extraction plate and/or of the capsule with the extraction plate and/or outlet membrane extending substantially transversally to such direction.

As shown in FIG. 13, the piercing member can move with the piercing elements being guided in translation in a series of through-passages 31 provided in the extraction plate. The piercing member can so slide reciprocally between the two positions. In the extended position of the piercing member, the support 28 abuts against the rear (or external surface) of the extraction plate 20 while the piercing elements in piercing configuration, are fully deployed beyond the free end surfaces of relief elements 26 of a few millimeters. The piercing elements can be arranged to traverse the relief elements. For this, each relief element is preferably centrally traversed by a through-passages 31. Flow channels 32 and outlets 22 provided in the channels may remain unhindered by the piercing elements. Alternatively or additionally, the piercing elements are lodged in through-passages provided in channels. The number of piercing elements is typically dependent on the opening surface area necessary to create a sufficiently lower extraction pressure. The piercing elements have a smaller individual transversal cross-section than the transversal cross-section of the relief elements. The transversal cross-section of a piercing element is smaller than 0.8 mm$^2$, preferably between 0.1 and 0.6 mm$^2$.

The piercing member can be moved between the two (retracted and deployed) positions by drive member 30. The drive member is arranged to move the piercing member relative to the extraction plate preferably in the translational direction between the retracted position and deployed position of the piercing elements. The drive member may include a solenoid piston, for instance, or a hydraulic piston or a stepped electrical motor, which can be connected to a shaft 77 of support 28 of the piercing member or be connected directly to the support. For example, a hydraulic piston could be actuated by the water pump of the beverage machine via a fluidic line which is independent from the water injection to the injection part.

Figure 7:
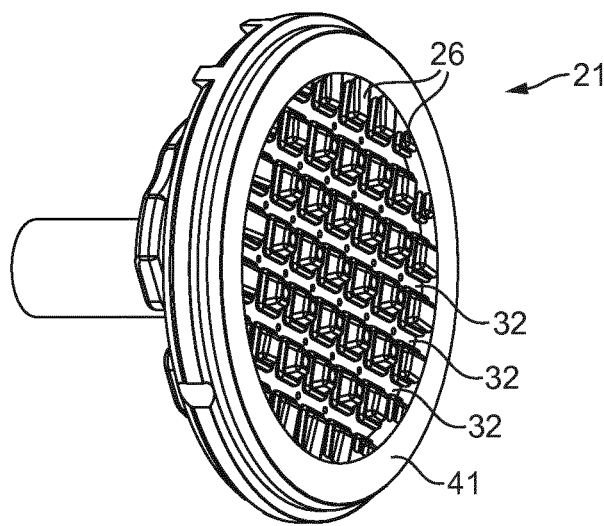
FIG. 7 is a perspective partial view of the extraction plate with the piercing member in the retracted position.
Figure 8:
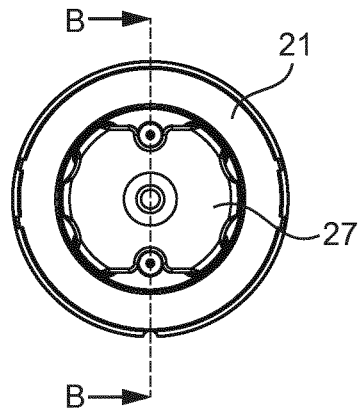
FIG. 8 is a planar front view of the extraction plate and piercing member associated therewith.
Figure 9:
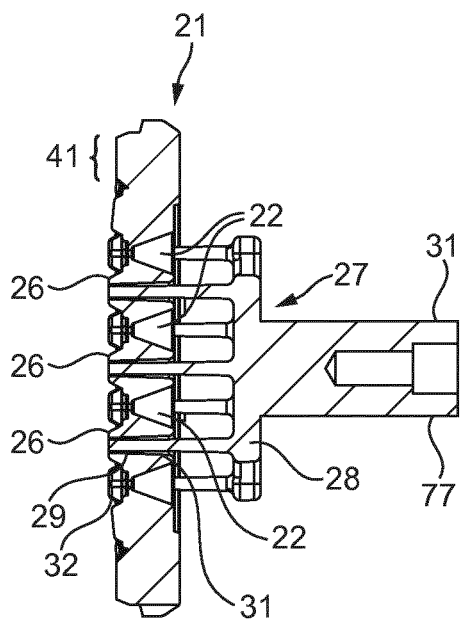
FIG. 9 is a cross-sectional view along plane B-B of the extraction plate of FIG. 8 and piercing member associated therewith.

FIGS. 7 and 9 illustrate the retracted position of the piercing member which also corresponds to the high-pressure extraction position in which the outlet membrane is perforated or torn by the series of relief elements to form orifices of the first type. The plate may be arranged with several arrays of individual pyramid-shaped relief elements separated by a network of orthogonally arranged channels 32 such as described in the description of EP0512470 in relation to FIG. 10. The relief elements may comprise inclined side surfaces of angles between 10 and 30° with terrace zones and flow channels. The relief elements may be rectilinear radial sections such as identical or similar to the ones described in relation to FIGS. 2, 5a-5d and 8 of EP0512470. The extraction plate can be such that, for forming the orifice of the first type, the relief elements tear the outlet membrane at the location of these relief elements on reaching the breaking stress of the membrane to enable the beverage to flow in the channels and leave through the beverage outlets 22. The opening pressure of the outlet membrane in this configuration can be of several bar, e.g. between 7 and 12 bar depending on the characteristics of the roast-and-ground beverage (i.e. blend, weight, granulometry, tapped density, etc.) and of the outlet membrane (material, thickness).

Beverage machine 33 includes extraction unit 1. The beverage machine generally comprises a pump 34 for supplying water to the extraction unit and a control unit 35 configured for controlling the drive member 30 which moves the piercing member between the two positions. The beverage machine may also comprise a water tank 36 for supplying the pump 34 with water via a fluidic line 37. The machine may comprise a water flow sensor 76 for measuring the flow rate of water fed to the injection part of the extraction unit and sending the flow rate input to the control unit for comparison with a flow rate set point and for control of the flow rate of the pump in return.

The beverage machine may comprise mode selection means 38 for selecting the pressure extraction mode of the extraction unit. The selection means 38 may, for instance, comprise physical or virtual buttons on a user interface. The mode selection means could also be arranged at distance of the beverage machine such as on remote user interface, e.g. a smart phone and the like. The mode selection means preferably comprises at least one high pressure extraction mode in which the control unit operates the pump to supply water to the extraction unit while maintaining the piercing member in retracted position as in FIG. 3. It also preferably comprises at least one lower pressure extraction mode in which the control unit operates the drive member 30 to drive the piercing member in extended position to pierce the outlet membrane as in FIG. 5 before operating the pump for supplying water to the extraction unit.

The beverage machine may further comprise an electrical motor 39 for automatically actuating the driving assembly 17 of the extraction unit between the open and closed positions of the injection part relative to the extraction part. The motor 39 is generally operated by the control unit 35 after a selection on the mode selection means 38 has been made by the user.

Figure 16:
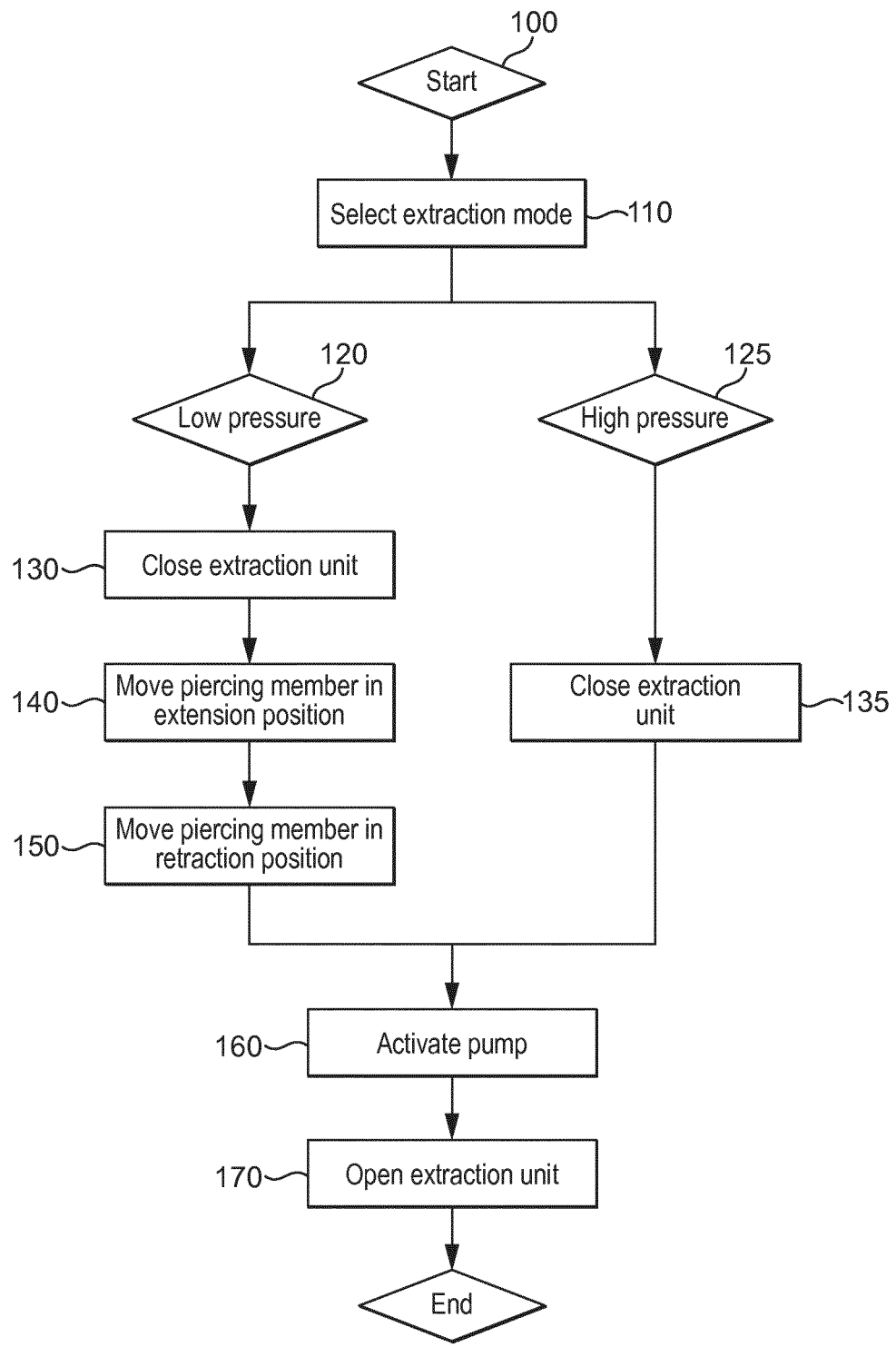
FIG. 16 is a flow chart for the operation of the beverage machine according to two different extraction modes.

FIG. 16 illustrates a flow chart of the operations of the beverage machine in the two possible extraction modes. If the machine is ready in step 100, a selection 110 of the extraction mode is enabled by the control unit on the mode selection means. It should be noted that the selection might not necessarily require user's selection if the beverage machine comprises a capsule identification system allowing the capsule to be identified e.g. via an optical code. The selection of the mode will be so carried out by capsule identification by the beverage machine.

In the low pressure extraction mode 120 selected, the extraction unit is closed by the motorized driving assembly operated by the control unit in step 130. The control unit also operates the drive member 30 to extend the piercing member in step 140. Obviously, this step can be omitted if the piercing member is already in extended position before start. The combination of the two operations, i.e. closing of the extraction unit and extension of the piercing member, provides a piercing of the outlet membrane of the capsule placed inside. In the next operation 150, the control unit operates the drive member 30 to retract the piercing member. As a result, the pierced orifices of the second type are obtained. The piercing elements disengaged from the pierced orifices thereby prevent an increase of the backpressure during extraction and facilitating the beverage flow towards the channels and through the extraction plate. In the next operation 160, the pump is activated (i.e. started and stopped) by the control unit to carry out the beverage extraction. The pump activation ends when the pump is stopped automatically or manually when the desired volume of beverage extract is reached. The pump may also be operated intermittently to provide pre-wetting of the dry coffee ingredient. The automatic stopping of the pump may be controlled by the flow sensor sending water volume input to the control unit. The extraction unit may optionally be automatically opened in a final operation 170. In a less preferred variant, the piercing member are moved in retraction position after the pump starts being activated but before its activation is ended. In this case, the retraction should preferably occur shortly after, e.g. less than 5 sec., the pump is started.

Figure 10:
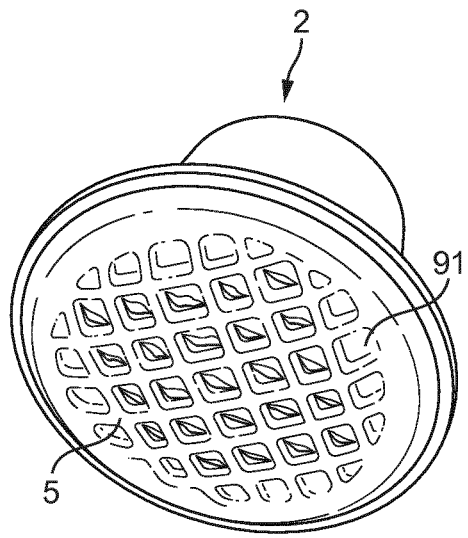
FIG. 10 shows an exchangeable capsule with a multitude of orifices of the first type 91 after extraction according to the high pressure mode.
Figure 15:
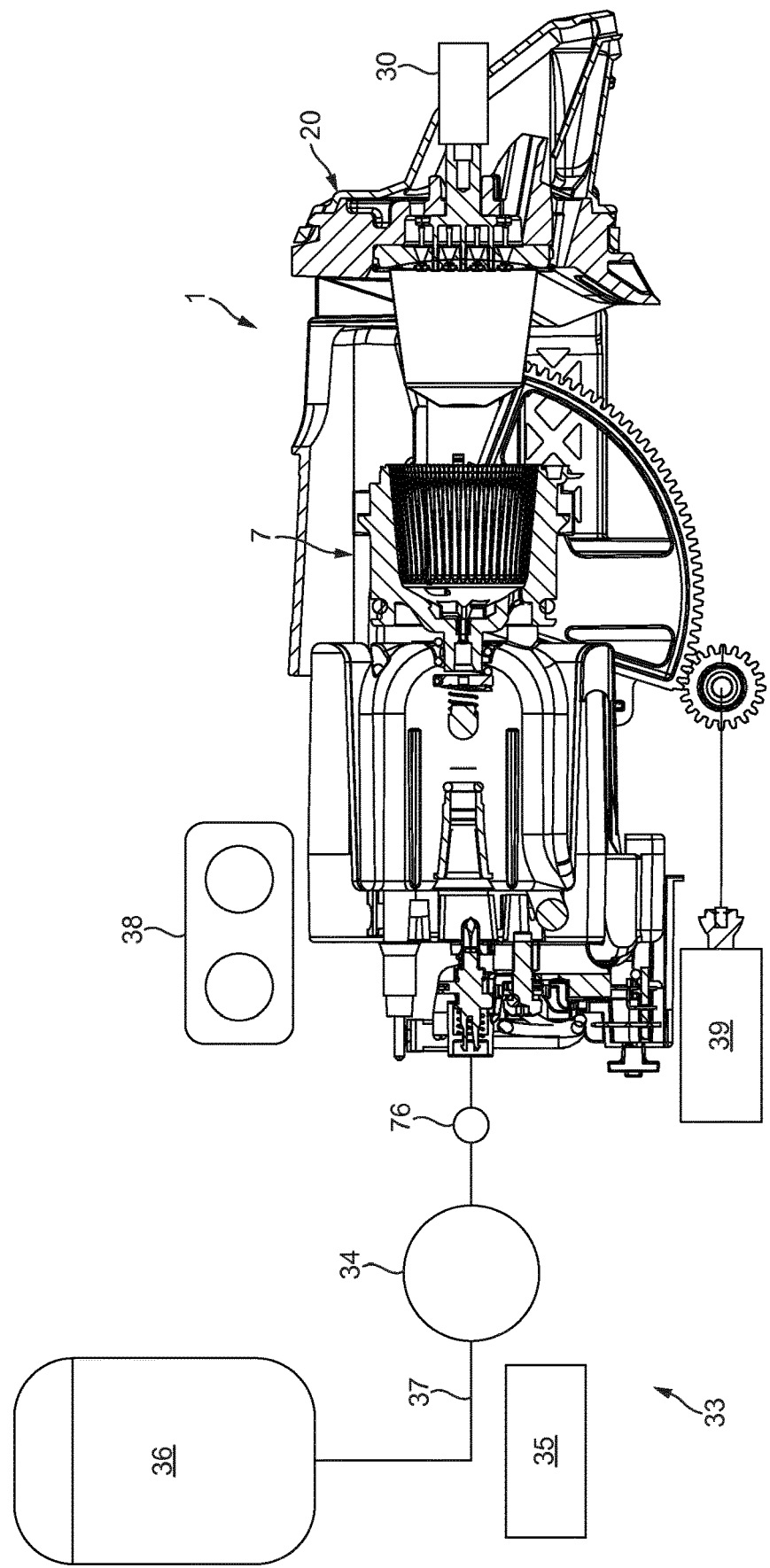
FIG. 15 is a schematic representation of a beverage machine including the extraction unit of the invention.

If the high pressure mode 125 is selected, the control unit does not operate the piercing member in extended position or, if the piercing member is already in extended position, it operates them in retracted position. The control unit may directly close the extraction unit in step 135 and activate the pump to start and stop water supply to the brewing chamber. As the pressure in the capsule increases, the outlet membrane perforates against the relief elements to form orifices of the first type 91 (FIG. 10). The orifices generally in contact with the relief elements thereby creating a high flow resistance. The flow resistance created by these orifices is so higher than the flow resistance created by the orifices of the second type (FIG. 14) of the low pressure mode.

Figure 17:
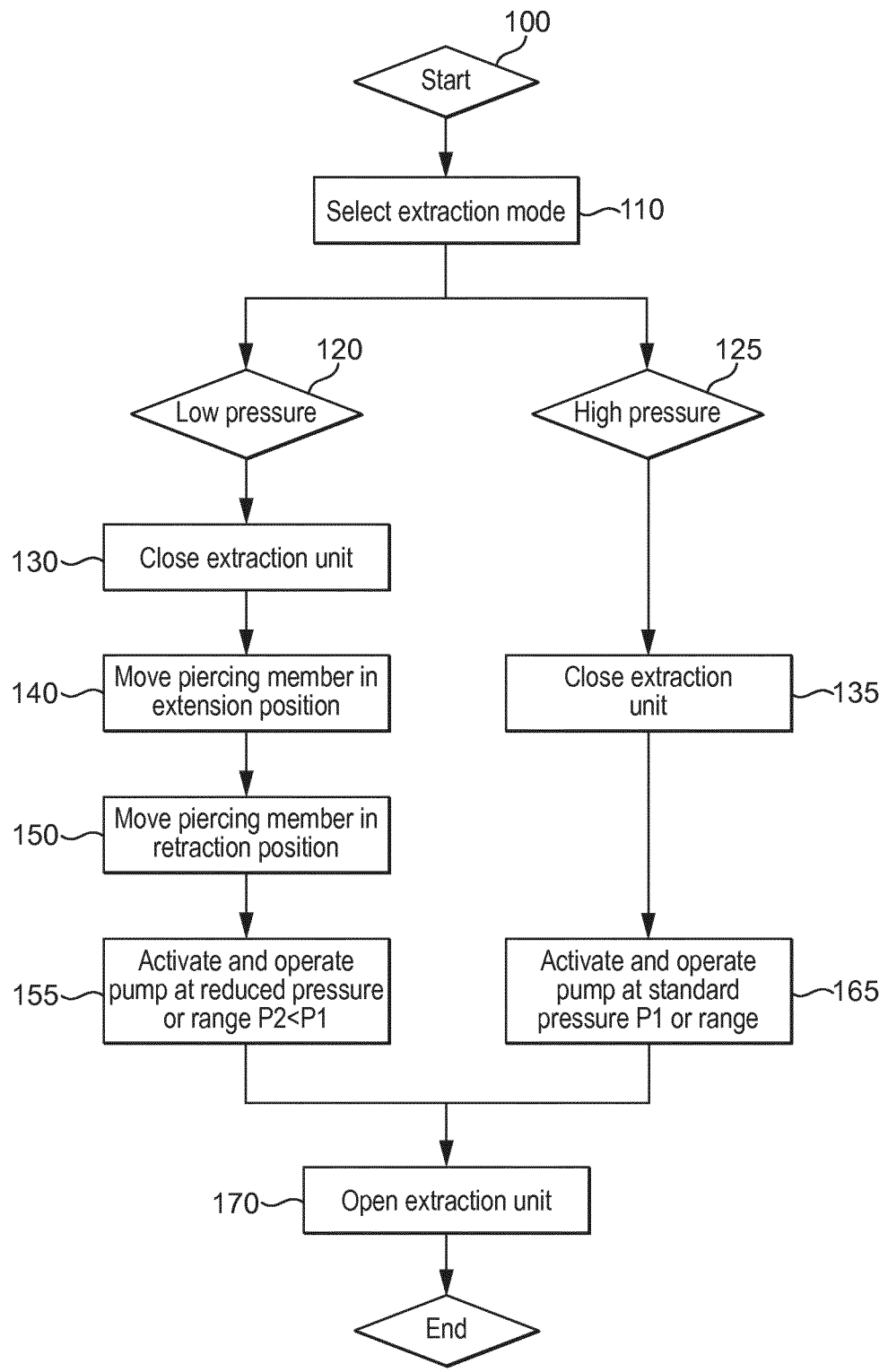
FIG. 17 is a variant of the flow chart of FIG. 16.

FIG. 17 illustrates a variant of the flow chart of the operations of the beverage machine in the two possible extraction modes. The difference with the preceding operation is that the control unit can vary the pressure and/or flow rate of the pump. Preferably, the control unit operates the pump at reduced pressure in the low pressure extraction mode (Step 155) and operates the pump at a standard pressure in the high pressure extraction mode (Step 165).

In the lower pressure mode, the production of coffee crema can be reduced or suppressed by reducing pressure delivered by the pump. The control unit preferably operates the pump at a pressure or pressure range P2 within a range of e.g. 1 to 5 bar above atmospheric pressure. In the high pressure mode, the pressure of water delivered by pump is increased above 6 bar, preferably within a range of 8 to 20 bar. The pressure can be varied by varying the electrical power or voltage supplied to the pump generally causing a variation of the beverage flow rate. For instance, the electrical power or voltage reduction may be controlled by the control unit which controls the flow rate measured by the water flow sensor relative to at least one water flow rate set point. Alternatively or additionally, the power or voltage reduction can be monitored by the control unit which controls the water pressure supplied to the extraction unit such as via a pressure sensor relative to at least one water pressure rate set point.

Figure 18:
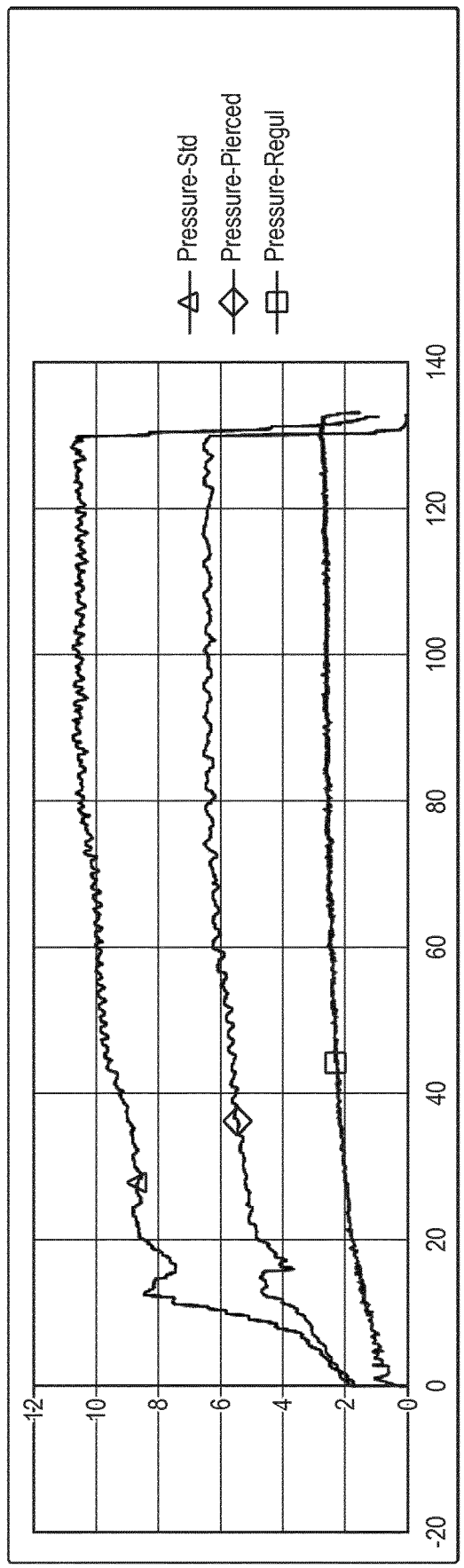
FIG. 18 shows a graphic of representative pressure profiles according to three possible extraction modes: a high-pressure extraction mode, a low pressure extraction mode without flow regulation and a low pressure extraction mode with flow regulation.

FIG. 18 illustrates the water pressure profiles as function of time in possibly three extraction modes. The upper curve represents the variation of pressure in standard conditions in which the outlet membrane is perforated by the relief elements under the effect of pressure. The capsule is opened under the effect of pressure only against the plurality of relief elements. The middle curve represents the variation of pressure after piercing of the membrane by the piercing member without flow reduction by the pump. The lower curve represents the variation of pressure after having pierced of the membrane by the piercing member and with a flow reduction by the pump.

Figure 19:
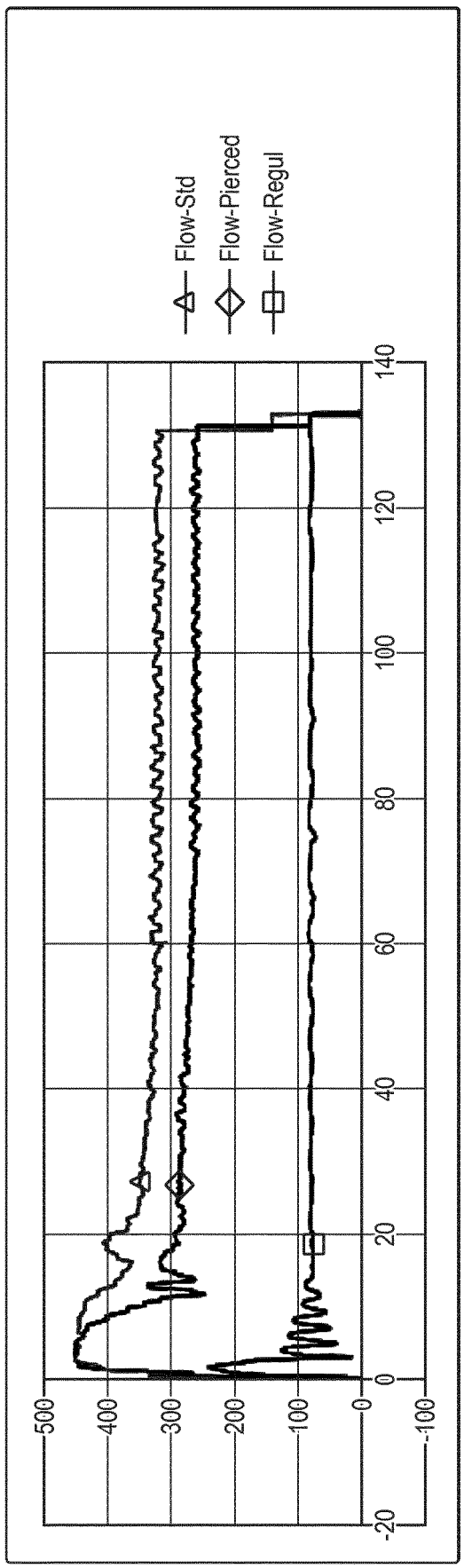
FIG. 19 shows the graphic of representative flow profiles according to the three modes of FIG. 18.

FIG. 19 illustrates the corresponding water flow profiles as function of time in the extraction modes of FIG. 18. The same order of the curves (high, medium, low) is obtained.

The invention claimed is:

1. A beverage extraction unit configured for extracting a beverage from an exchangeable capsule containing beverage ingredients, the exchangeable capsule comprising a liquid entry wall and a beverage outlet membrane; the beverage extraction unit comprising:
   a frame,
   an injection part configured for accommodating the liquid entry wall of the exchangeable capsule and comprising a water inlet configured for injection of water in the exchangeable capsule,
   an extraction part arranged for closing with the injection part to form an extraction chamber;
   wherein the extraction part comprises an extraction plate having outlets for draining the liquid beverage extract, the extraction plate having a plurality of relief elements configured for providing orifices of a first type in the beverage outlet membrane resulting from the beverage outlet membrane being pressed onto the plurality of relief elements under pressure of the water supplied in the extraction chamber;
   wherein the extraction part further comprises a plurality of piercing elements configured for providing orifices of a second type in the beverage outlet membrane;
   wherein the plurality of piercing elements is arranged in a moveable manner relatively to and through the extraction plate between:
      a deployed position in which the plurality of piercing elements extends beyond the plurality of relief elements of the extraction plate for providing orifices of the second type in the beverage outlet membrane of the exchangeable capsule enclosed in the extraction chamber; and
      a retracted position in which the plurality of piercing elements is retracted relative to the deployed position that the plurality of relief elements extends beyond the plurality of piercing elements or at least substantially to a level of the plurality of piercing elements.

2. The beverage extraction unit according to claim 1, wherein the plurality of piercing elements comprises at least one of needles, pins, and/or blades.

3. The beverage extraction unit according to claim 1, wherein in the extended position, the plurality of piercing elements is arranged through the extraction plate to traverse the plurality of relief elements.

4. The beverage extraction unit according to claim 1, wherein the plurality of the piercing elements is part of a piercing member arranged to be moveable relatively to the extraction plate between the extended position and the retracted position of the plurality of piercing elements, and the piercing member comprising a support plate from which extends the plurality of piercing elements.

5. The beverage extraction unit according to claim 4, wherein the piercing member is arranged to move in an at least substantially translational and axial direction relative to the extraction plate.

6. The beverage extraction unit according to claim 4, comprising a drive member arranged for operating the piercing member and/or the extraction plate in relative movement between the retracted position and the extended position of the plurality of piercing elements.

7. A beverage machine comprising a beverage extraction unit according to claim 6, the beverage machine comprising a pump configured for supplying the water to the extraction unit and a control unit configured for controlling the drive member to move the piercing member relative to the extraction plate between the extended position and the retracted position of the plurality of piercing elements.

8. The beverage machine according to claim 7, wherein the control unit is configured to operate the drive member to drive the piercing member back in retracted position before activating the pump for supplying the water to the extraction chamber or after a period of less than 5 seconds after starting the activation of the pump.

9. The beverage machine according to claim 8, comprising a mode selection member comprising:
  a high-pressure extraction mode in which the control unit activates the pump to supply the water to the extraction unit while maintaining the piercing member in retracted position; and
  a lower-pressure extraction mode in which the control unit operates the drive member to drive the piercing member in extended position of the plurality of piercing elements to provide the orifices of second type in the beverage outlet membrane of the exchangeable capsule before operating the pump for supplying the water to the extraction chamber.

10. The beverage machine according to claim 9, wherein the control unit is configured to operate the pump at a pressure or pressure range for the lower-pressure extraction mode which is lower than a pressure or pressure range for the high-pressure extraction mode.

11. The beverage machine according to claim 8, comprising a motorized drive assembly configured for closing the injection part with the extraction part, wherein the control unit is configured for operating the motorized drive assembly between an opening position of the extraction unit and a closed position of the extraction unit, and wherein the control unit is configured for operating the piercing member in extended position for providing orifices of the second type in the beverage outlet membrane in the closed position of the extraction unit.

12. A beverage extraction unit, configured for extracting a beverage from an exchangeable capsule containing beverage ingredients, the exchangeable capsule comprising a liquid entry wall and a beverage outlet membrane; the beverage extraction unit comprising:
  a frame,
  an injection part configured for accommodating the liquid entry wall of the exchangeable capsule and comprising a water inlet configured for injection of water in the exchangeable capsule,
  an extraction part arranged for closing with the injection part to form an extraction chamber;
  wherein the extraction part comprises an extraction plate having outlets for draining the liquid beverage extract, the extraction plate having a plurality of relief elements configured for providing orifices of a first type in the beverage outlet membrane resulting from the beverage outlet membrane being pressed onto the plurality of relief elements under pressure of the water supplied in the extraction chamber;
  wherein the extraction part further comprises a plurality of piercing elements configured for providing orifices of a second type in the beverage outlet membrane;
  wherein the plurality of piercing elements is arranged in a moveable manner relatively to and through the extraction plate between:
    a deployed position in which the plurality of piercing elements extends beyond the plurality of relief elements of the extraction plate for providing orifices of the second type in the beverage outlet membrane of the exchangeable capsule enclosed in the extraction chamber; and
    a retracted position in which the plurality of piercing elements is retracted relative to the deployed position that the plurality of relief elements extends beyond the plurality of piercing elements or at least substantially to a level of the plurality of piercing elements;
  wherein the plurality of relief elements is truncated pyramids and/or portions of ridges separated by channels with the outlets.

13. A beverage extraction unit configured for extracting a beverage from an exchangeable capsule containing beverage ingredients, the exchangeable capsule comprising a liquid entry wall and a beverage outlet membrane; the beverage extraction unit comprising:
  a frame,
  an injection part configured for accommodating the liquid entry wall of the exchangeable capsule and comprising a water inlet configured for injection of water in the exchangeable capsule,
  an extraction part arranged for closing with the injection part to form an extraction chamber;
  wherein the extraction part comprises an extraction plate having outlets for draining the liquid beverage extract, the extraction plate having a plurality of relief elements configured for providing orifices of a first type in the beverage outlet membrane resulting from the beverage outlet membrane being pressed onto the plurality of relief elements under pressure of the water supplied in the extraction chamber;
  wherein the extraction part further comprises a plurality of piercing elements configured for providing orifices of a second type in the beverage outlet membrane;
  wherein the plurality of piercing elements is arranged in a moveable manner relatively to and through the extraction plate between:
    a deployed position in which the plurality of piercing elements extends beyond the plurality of relief elements of the extraction plate for providing orifices of the second type in the beverage outlet membrane of the exchangeable capsule enclosed in the extraction chamber; and a retracted position in which the plurality of piercing elements is retracted relative to the deployed position that the plurality of relief elements extends beyond the plurality of piercing elements or at least substantially to a level of the plurality of piercing elements;

wherein the plurality of the piercing elements is part of a piercing member arranged to be moveable relatively to the extraction plate between the extended position and the retracted position of the plurality of piercing elements, and the piercing member comprising a support plate from which extends the plurality of piercing elements;

wherein the piercing member is arranged to move in an at least substantially translational and axial direction relative to the extraction plate; and a drive member arranged for operating the piercing member and/or the extraction plate in relative movement between the retracted position and the extended position of the plurality of piercing elements;

wherein the drive member operates the piercing member and/or the extraction plate independently from the pressure exerted in the extraction chamber.

14. A beverage preparation system comprising:
an exchangeable capsule containing beverage ingredients for extraction; and
an extraction unit for extracting a beverage from the exchangeable capsule comprising a liquid entry wall and a beverage outlet membrane;
the extraction unit comprising:
a frame,
an injection part configured for accommodating the liquid entry wall of the exchangeable capsule and comprising a water inlet configured for injection of water in the exchangeable capsule,
an extraction part arranged for closing with the injection part to form an extraction chamber;
wherein the extraction part comprises an extraction plate having outlets for draining the liquid beverage extract, the extraction plate having a plurality of relief elements configured for providing orifices of a first type in the beverage outlet membrane resulting from the beverage outlet membrane being pressed onto the relief elements under pressure of the water supplied in the extraction chamber;
wherein the extraction part further comprises a plurality of piercing elements configured for providing orifices of a second type in the beverage outlet membrane;
wherein the plurality of piercing elements are arranged in a moveable manner relatively to and through the extraction plate between:
a deployed position in which the plurality of piercing elements extends beyond the plurality of relief elements of the extraction plate for providing orifices of the second type in the beverage outlet membrane of the exchangeable capsule enclosed in the extraction chamber; and
a retracted position in which the plurality of piercing elements are so retracted relative to their deployed position that the plurality of relief elements extends beyond the plurality of piercing elements or at least substantially to a level of the plurality of piercing elements, the capsule comprising a liquid entry wall and a beverage outlet membrane.

15. The beverage preparation system according to claim 14, wherein the exchangeable capsule has a circumferential flange to and/or at which the beverage outlet membrane is sealed.

16. A method of using an exchangeable capsule containing beverage ingredients for extraction in the extraction chamber of an extraction unit, the extraction unit configured for extracting a beverage from the exchangeable capsule comprising a liquid entry wall and a beverage outlet membrane;
the extraction unit comprising:
a frame,
an injection part configured for accommodating the liquid entry wall of the exchangeable capsule and comprising a water inlet configured for injection of water in the exchangeable capsule,
an extraction part arranged for closing with the injection part to form an extraction chamber;
wherein the extraction part comprises an extraction plate having outlets for draining the liquid beverage extract, and the extraction plate having a plurality of relief elements configured for providing orifices of a first type in the beverage outlet membrane resulting from the beverage outlet membrane being pressed onto the plurality of relief elements under pressure of water supplied in the extraction chamber;
wherein the extraction part further comprises a plurality of piercing elements configured for providing orifices of a second type in the beverage outlet membrane;
wherein the plurality of piercing elements is arranged in a moveable manner relatively to and through the extraction plate between:
a deployed position in which the plurality of piercing elements extends beyond the plurality of relief elements of the extraction plate for providing orifices of the second type in the beverage outlet membrane of the exchangeable capsule enclosed in the extraction chamber; and
a retracted position in which the plurality of piercing elements is retracted relative to their deployed position that the plurality of relief elements extends beyond the plurality of piercing elements or at least substantially to a level of the plurality of piercing elements, the exchangeable capsule comprising a liquid entry wall and the beverage outlet membrane;
the method comprising:
pressing the beverage outlet membrane onto the plurality of relief elements to provide the orifices of the first type in the beverage outlet membrane.

* * * * *